Figure 1:
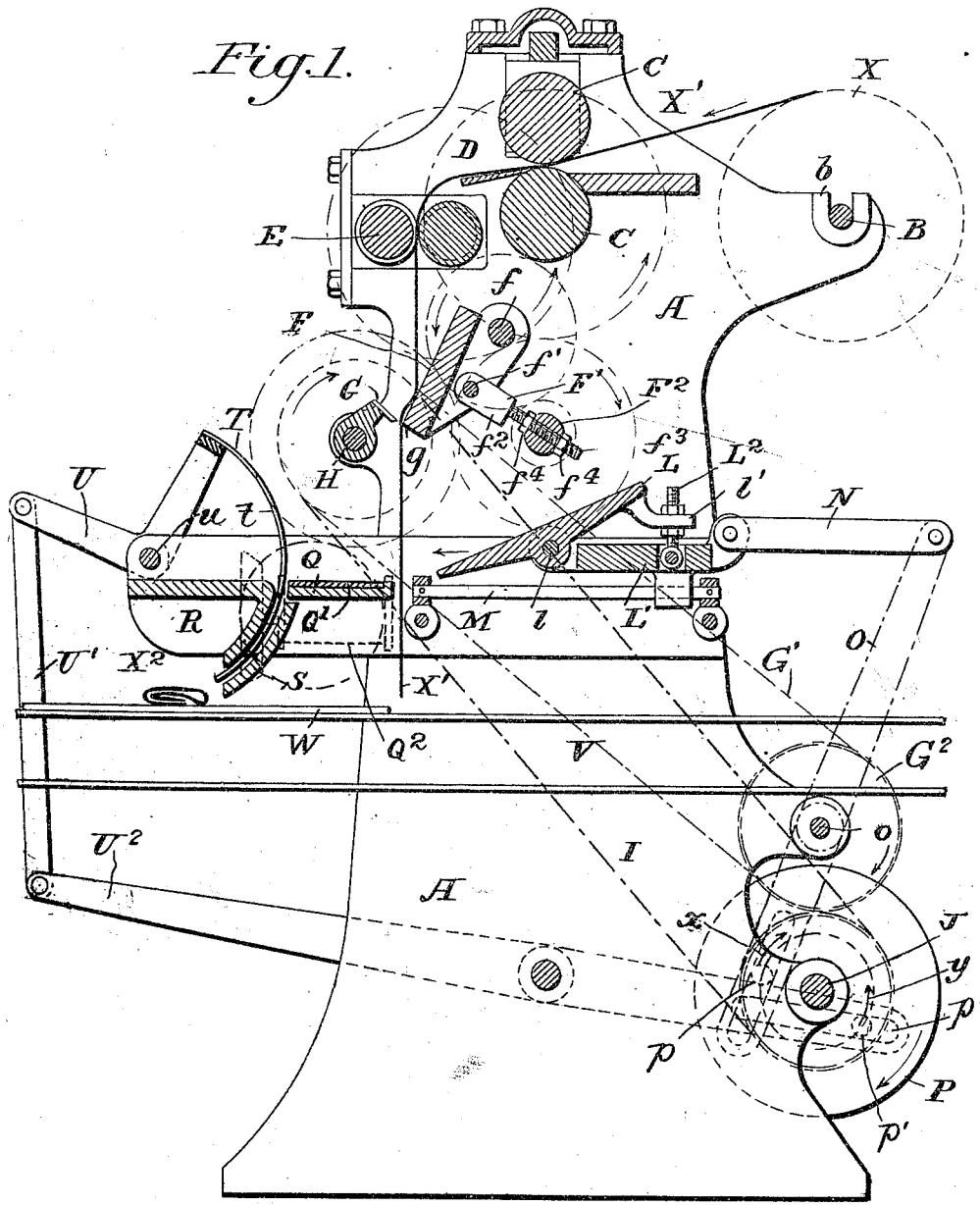

A. WILD.
MACHINE FOR FORMING NOODLES.
APPLICATION FILED JUNE 10, 1909.

1,090,509.

Patented Mar. 17, 1914.
4 SHEETS—SHEET 1.

Witnesses:

Inventor:
Anton Wild
by his Attorneys

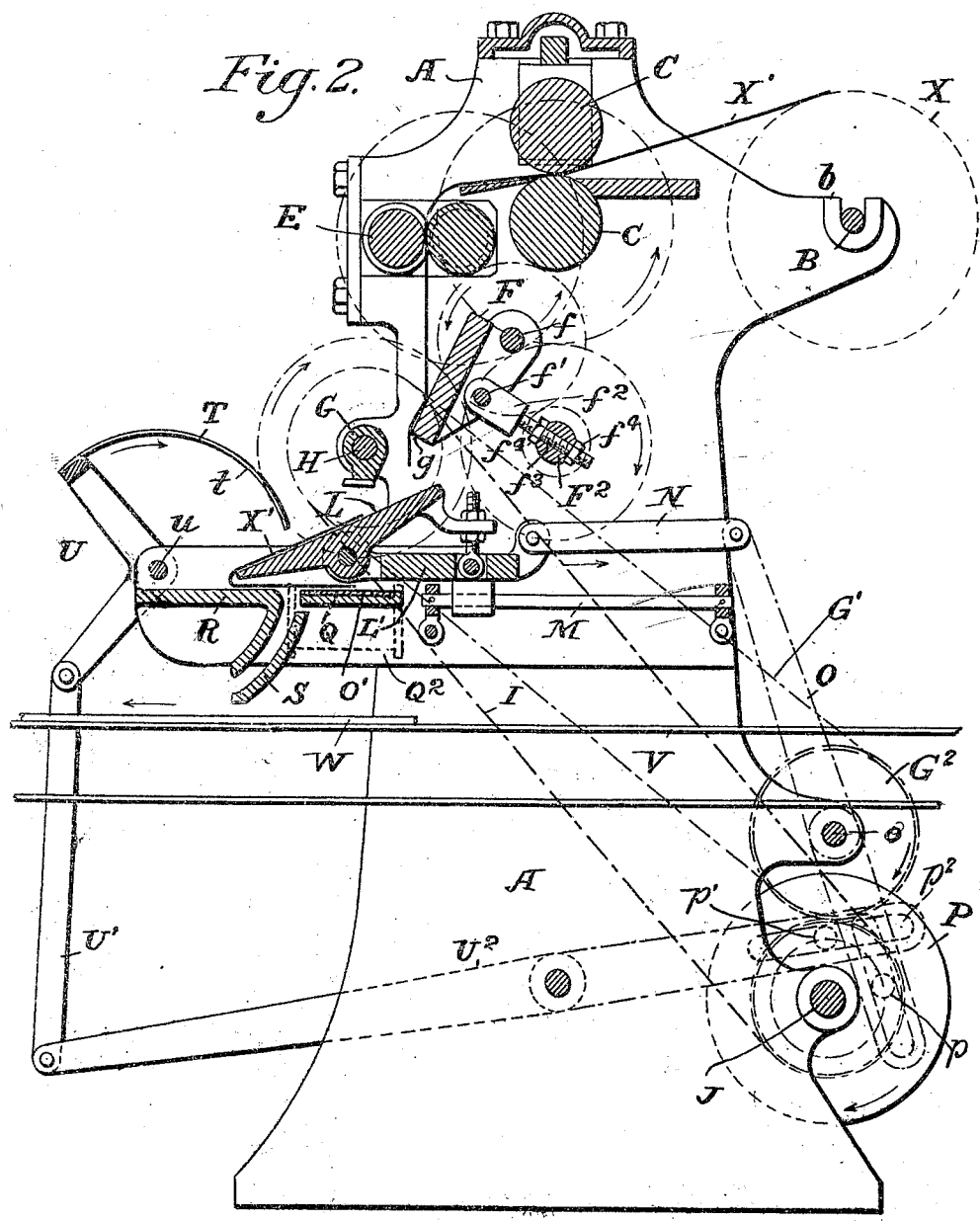

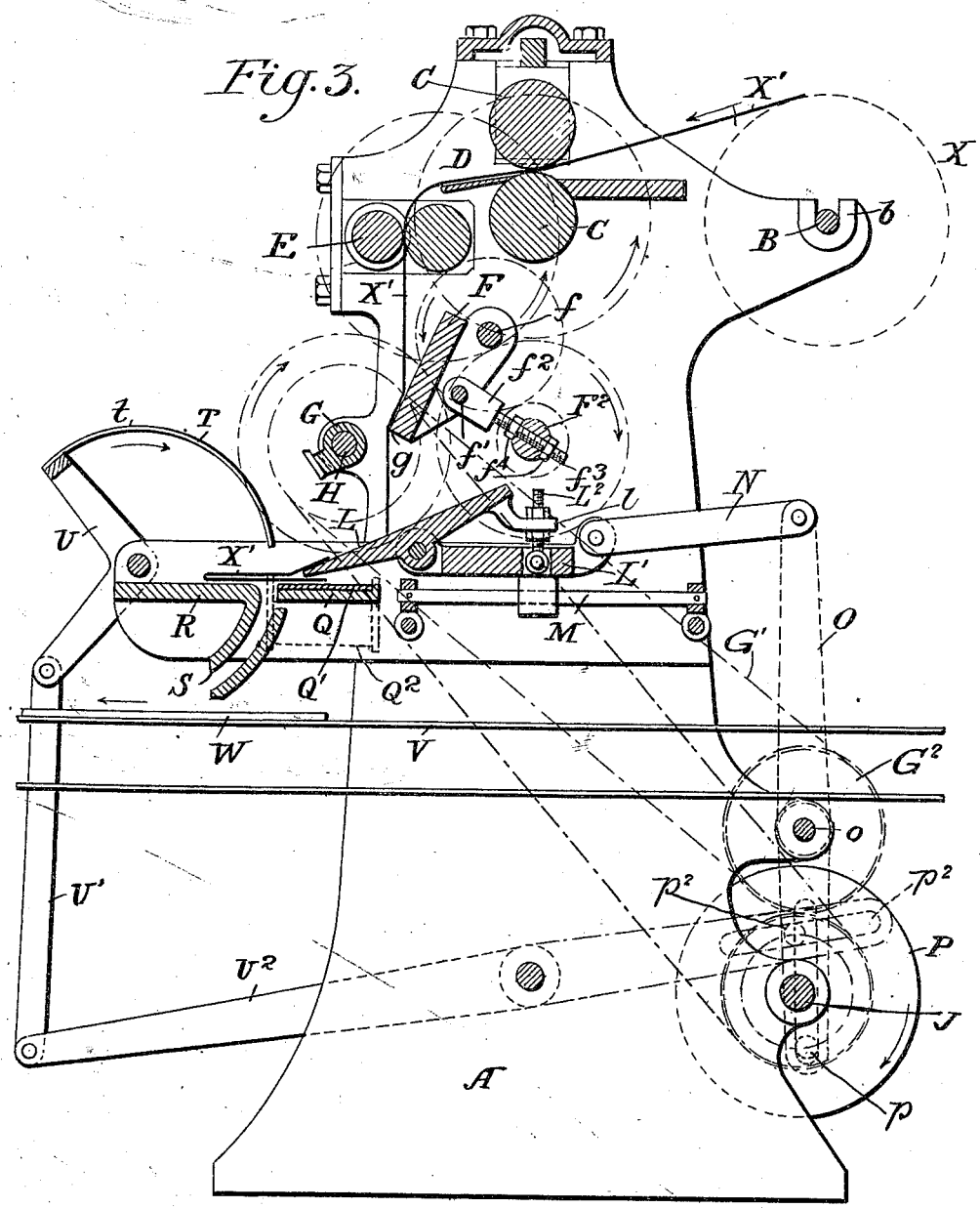

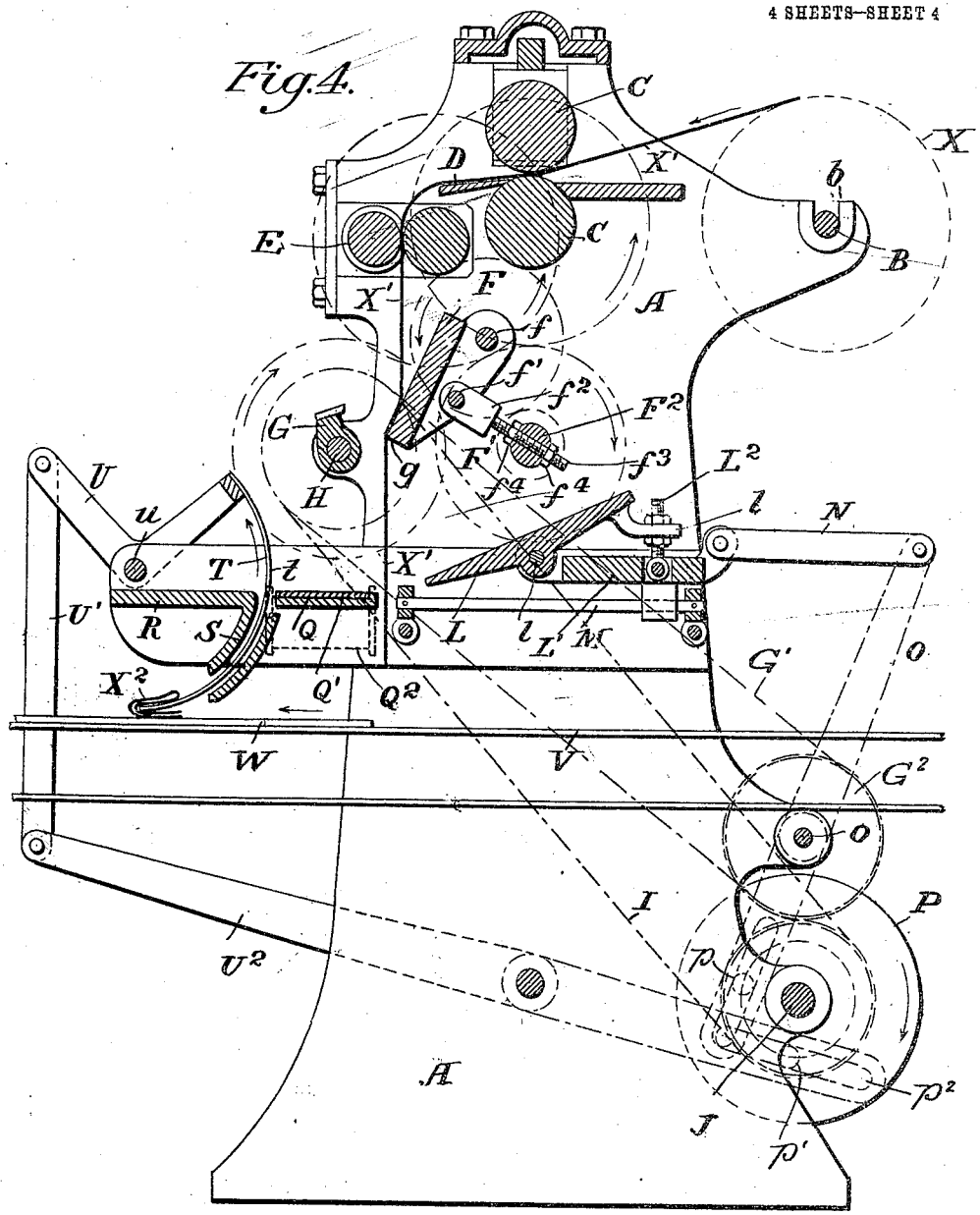

UNITED STATES PATENT OFFICE.

ANTON WILD, OF SAGINAW, MICHIGAN, ASSIGNOR TO WERNER & PFLEIDERER, OF SAGINAW, MICHIGAN, A FIRM.

MACHINE FOR FORMING NOODLES.

1,090,509.

Specification of Letters Patent. Patented Mar. 17, 1914.

Application filed June 10, 1909. Serial No. 501,302.

*To all whom it may concern:*

Be it known that I, ANTON WILD, a subject of the Emperor of Germany, residing in Saginaw, in the county of Saginaw and State of Michigan, have invented certain new and useful Improvements in Machines for Forming Noodles, of which the following is a specification.

The primary object of my invention is to provide a machine for giving proper shape to dough to form "noodles" but my improvements may be embodied in machines for forming dough articles of various kinds.

According to this invention the machine is preferably constructed in such manner that a rolled sheet of dough is mounted in suitable bearings in such a way that the sheet may be drawn from the roll and passed through pressing or finishing rollers from which it passes through cutters which form from the sheet, ribbons of dough that are conveyed past a cutter arranged to sever the ribbons into suitable lengths for forming noodles of the desired size. The machine is equipped with a folding device which, as the ribbons are severed into lengths, engages the ribbons intermediate their ends and operating in connection with a folding board, bends or folds the ribbons and causes them to be deposited on the folding board and on a table above a curved chute arranged immediately over a traveling belt. An oscillating folder engages the ribbons thus folded intermediate their ends, folds them the second time and forces them through the chute on to the traveling belt. The folding device is so arranged that it may be adjusted to fold the ribbons so that the two parts of the fold shall be equal in length or of any desired length. The board which coöperates with the folding devices above referred to preferably carries a slowly moving belt on which the dough ribbons are deposited when being given their first fold and this belt operates to move the lower fold of each ribbon slightly sidewise before the folding is completed so that when the first fold is finished the lower member of the fold will project slightly sidewise from the upper member. In this way the noodles are put into better shape for drying. Other means may be adopted for giving this sidewise movement to the ribbons; for instance, a slight sidewise movement may be given to the folding board and the belt may be omitted.

Each figure of the accompanying drawings shows a vertical central section through a machine embodying my improvements.

Figure 1 shows the mechanism in the position the parts assume just before the ribbons are cut into lengths and just before the folding devices operate. Fig. 2 shows the arrangement of the parts during the first folding operation. Fig. 3 shows how the mechanism appears when the devices for forming the first fold are being withdrawn and the oscillating folder is about to operate. Fig. 4 shows the positions of the mechanism as it appears when the oscillating folding device has operated to give the second fold to the ribbons and to deposit the noodles on the traveling belt.

The main frame A may be of any construction suitable to support the various parts of the mechanism. The roll of dough X is supported on a shaft B mounted in open bearings $b$ in the upper part of the main frame. It will be understood that the dough is formed into a wide sheet in any suitable way and wound into a roll X in suitable condition for the sheet to be unwound from the roll in the manner indicated. From the roll X the sheet of dough passes between pressing or finishing rollers C and over a guide-board D to cutting rollers E which sever the sheet into ribbons of suitable widths.

From the cutters the ribbons pass to a guide-board F provided with adjusting devices F' by means of which its inclination may be varied. As shown, the guide-board F is pivoted to the main frame at $f$ and it is pivotally connected at $f'$ with a rod $f^2$ having a threaded portion $f^3$ extending through a shaft F² which is mounted in the main frame in such manner that it may be adjusted or turned about its axis. The threaded portion $f^3$ of the rod is provided with clamping nuts $f^4$. The guide-board has a cutting edge at $g$ coöperating with a rotary cutting knife G mounted on a shaft H geared, as indicated in the drawings, by a belt G' with a pulley G² which is driven in the direction of the arrow. The shaft H is connected by the gearing shown with the rotary cutters E and the pressing rollers C.

Below the plane of the knife there is a folding device. This, preferably, as shown, consists of a board L pivotally connected at $l$ with a slide L′ mounted to reciprocate on a guide M. The slide is reciprocated by means of a link N and a lever O pivoted at $o$ to the main frame and connected, as shown, with an operating wheel P mounted on the driving shaft J. The pivot $l$ of the folding device L is preferably located about midway between the ends of the folding device and the rear end thereof is provided with an arm $l'$ engaged by an adjusting screw $L^2$ carried by the slide L′. By these devices the front edge of the folding device may be raised and lowered so as to engage the ribbons either midway between their opposite ends or at any other desired intermediate point. The lever O is slotted at its lower end and is engaged by a pin $p$ on the wheel P. This wheel is driven in the direction indicated by the arrow $x$.

Q indicates a board, which is itself a folding device and which coöperates with the folding device L in giving the first fold to the ribbons. It will be observed by reference to Fig. 1 that the ribbons X′ pass down through an opening between the rear edge of the board Q and the front of the guides M so that when the folding device operates it presses the ribbons against the rear edge of the board Q and then deposits the folded ribbons over the board Q and on the stationary table R, in the manner indicated in Fig. 2 immediately above a curved chute S and immediately below an oscillating folding device T. The board Q preferably supports a belt Q′ which passes over rollers $Q^2$, one of which is indicated by dotted lines in Fig. 1, and which may be geared in any suitable way with the driving mechanism, so as to have a slow movement which will cause the belt to move to a slight extent sidewise the lower fold of each ribbon before the folding is completed so that when the first fold is finished the lower member of the fold will project slightly sidewise from the upper member. In this way the noodles are put into better shape for drying. The oscillating folding device T preferably consists of a curved blade $t$ adapted to operate in the curved chute S and which is mounted on a bell crank frame U pivoted at $u$ to the main frame and connected by a link U′ and a lever $U^2$ with an operating wheel similar to the wheel P and which carries a pin $p'$ engaging a slot $p^2$ in the lever $U^2$. The wheel carrying the pin $p'$ is driven in the direction indicated by the arrow $y$. The belt I is employed for driving other parts of the mechanism. After the ribbons have been given their first fold and the folding device L has withdrawn, as indicated in Fig. 3, the oscillating folder T is operated in the manner indicated in Fig. 4 to force the folded ribbons through the chute S and give to them their second fold when they will assume the shape indicated at $X^2$ in Fig. 4.

The noodles are received by a traveling belt V operated in any suitable way, but preferably intermittently so that the noodles may be spaced apart conveniently and if desired, instead of depositing the noodles directly on the belt, they may be deposited on trays W carried by the belt and these trays with the noodles thereon may be removed by an attendant at the proper time.

The mechanism is so constructed, geared and timed that the parts operate harmoniously—the folding device L engaging the ribbons immediately after they are severed or at the time of severing, the oscillating folder being held out of operation by the mechanism during the first folding step of the process and then after the first folding device has withdrawn, the oscillating folder will operate in the manner above described.

The mechanism illustrated is suitable for performing the operations above mentioned, but the construction of the machine may be changed and the details of construction thereof may be varied without departing from the novel features of my invention.

The operation of the machine has been described in connection with the description of the mechanism. Briefly stated, however, the operation is as follows:—The dough sheet is led between the pressing or finishing rollers C and over the guide board D and passed between cutting rollers E which sever the sheet into ribbons of suitable widths. From the cutters the ribbons pass to the guide board F which may, as before described, be set at any desired inclination to coöperate with the rotary cutting knife G which severs the ribbons into suitable lengths for forming noodles. That part of the ribbons below the knife extends past the edge of the board Q which constitutes a folding member and they also extend past the edge of the pivoted board L which constitutes a folding member coöperating with the folding member Q. At the time the ribbons are severed by the knife G the board L is moved toward the depending ribbons engaging them about midway between their upper and lower ends and carries them to the position shown in Fig. 2, thus producing the first fold in the noodles. The belt Q′ then moves transversely to the line of movement of the folder and causes the lower fold of the ribbons to be moved slightly sidewise relatively to the upper folds. Then the folding board L recedes, leaving the folded ribbons above the chute S, as indicated in Fig. 3. During these operations the ribbons are fed down over the board F in the manner shown in Fig. 3, the knife G being in the meantime revolved so as to come into position at the proper time to sever the ribbons again. After the reciprocating board L has retreated to the position shown in Fig. 3, the oscillating folder T is brought into operation and moves toward the folded noodles, shown in Fig. 3, folds them again and carries them through the chute S and deposits them on the belt V in the manner shown in Fig. 4, or on trays carried by said belt.

When the machine is in operation there is no hand labor required beyond putting the empty trays on the traveling belt and taking off the filled trays until the roll of sheet dough is entirely exhausted when a new roll may be placed in position and the machine will repeat the operations without further attention. If it is desired to give to the ribbons only a single fold, the oscillating folder T may be disconnected and the once folded ribbons may be received on the tables Q and R from which they may be taken. By providing means for adjusting the folding device L, the machine may be arranged to form noodles folded in various ways. Any desired extent of adjustment may be given to the device L.

I claim as my invention:

1. The combination of means for cutting a sheet of dough into strips, an inclined guide board for receiving the ribbons of dough, means for adjusting the inclination of this board, a cutter for severing the ribbons into suitable lengths while supported on the guide board, folding devices for said ribbons, and means for adjusting the folding devices to cause the ribbons to be folded at different points between their opposite ends.

2. The combination of means for feeding a strip or ribbon of dough, a folding member past the edge of which the ribbon is fed, a board constituting another folding member and adapted to engage the strip of dough intermediate its ends, a slide to which said last mentioned folding member is pivotally connected, a guide in which said slide reciprocates, and means connecting the slide and board for adjusting the inclination of said board for the purpose of causing the ribbons to be folded at different points between their opposite ends.

In testimony whereof, I have hereunto subscribed my name.

ANTON WILD.

Witnesses:
   Gustav O. Horslaebe,
   Archibald E. Halgrove.